E. C. ROWE AND A. MOHR.
WEIGHING SCALE.
APPLICATION FILED SEPT. 29, 1921.

1,436,360.

Patented Nov. 21, 1922.
4 SHEETS—SHEET 2.

Inventors:
Edgar C. Rowe,
Adolph Mohr

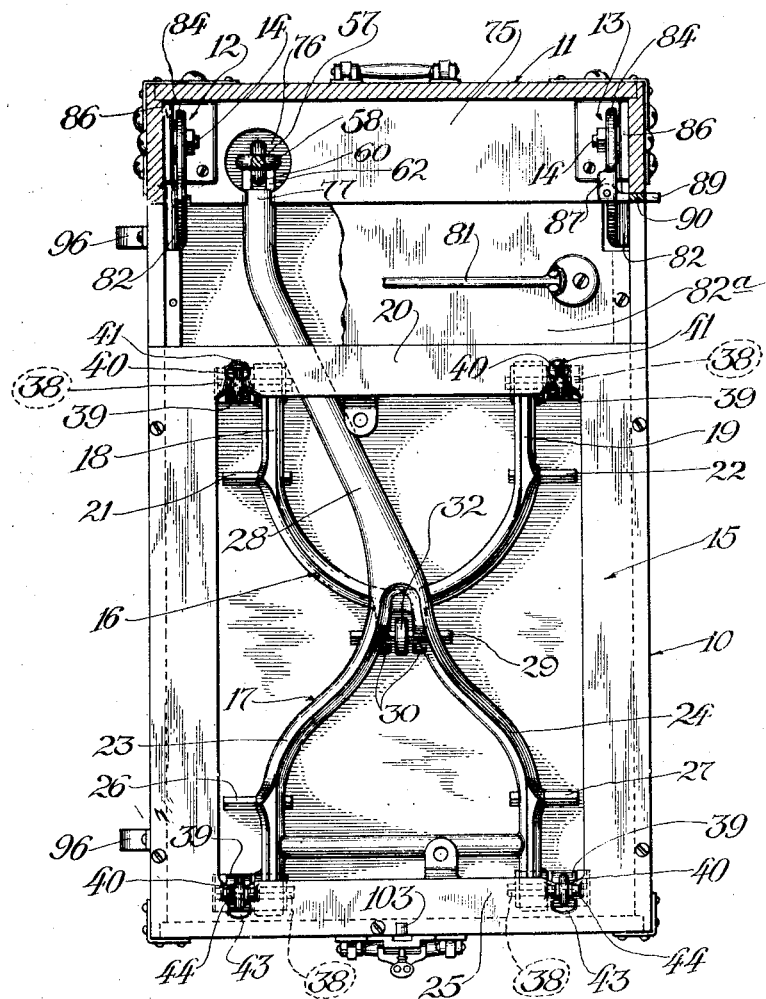

E. C. ROWE AND A. MOHR.
WEIGHING SCALE.
APPLICATION FILED SEPT. 29, 1921.
1,436,360.
Patented Nov. 21, 1922.
4 SHEETS—SHEET 4.
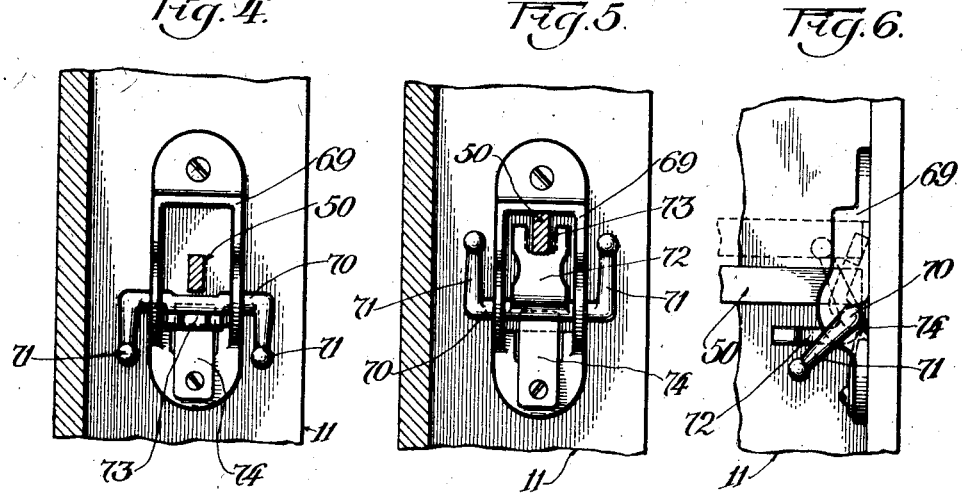
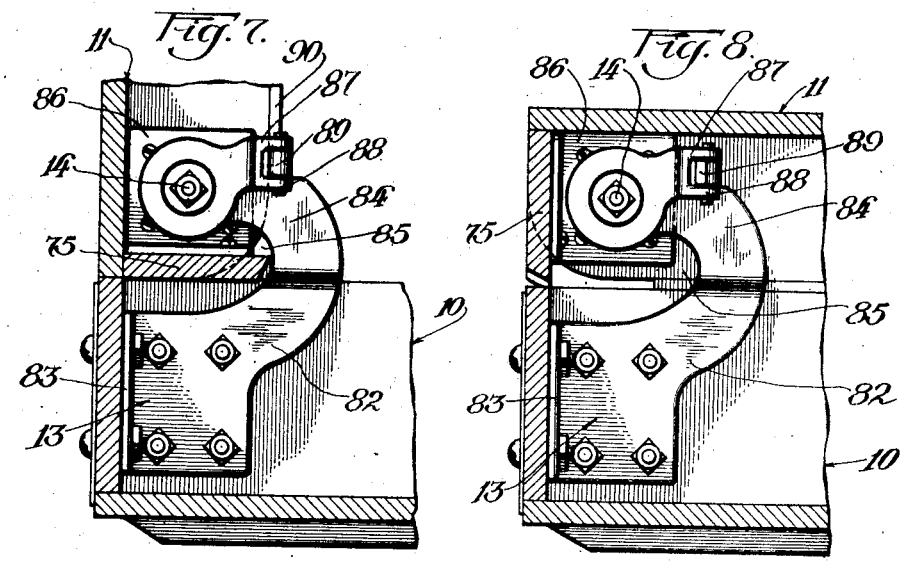
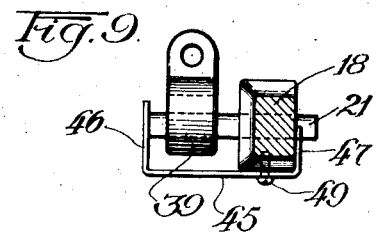
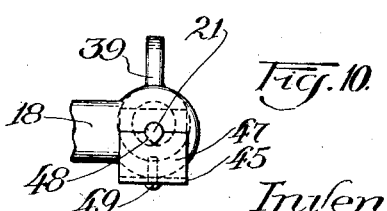
Inventors.
Edgar C. Rowe,
Adolph Mohr.

Patented Nov. 21, 1922.

1,436,360

UNITED STATES PATENT OFFICE.

EDGAR C. ROWE AND ADOLPH MOHR, OF CHICAGO, ILLINOIS, ASSIGNORS TO MASON, DAVIS & CO., OF CHICAGO, ILLINOIS, A CORPORATION OF MAINE.

WEIGHING SCALE.

Application filed September 29, 1921. Serial No. 504,146.

*To all whom it may concern:*

Be it known that we, EDGAR C. ROWE and ADOLPH MOHR, both citizens of the United States, and both residing at Chicago, Cook County, Illinois, have invented certain new and useful Improvements in Weighing Scales, of which the following is a specification.

This invention has to do with certain improvements in weighing scales. It has reference particularly to improvements in platform scales for weighing. More particularly the invention has reference to certain improvements in platform weighing scales which may be folded up into a small compact form, and which when so folded shall be light enough and conveniently formed so as to be readily carried from place to place.

We will state in this connection that the weighing scales to which the present invention particularly relates are especially intended for use in connection with schools and various institutions in connection with testing the physical fitness and condition of the children. For this use the scales must be accurate, but especially they should be light enough and conveniently arranged so that they can be readily carried about.

One of the objects of the invention is to provide an improved form of folding scale. In this connection one of the objects is to provide a box like enclosure for the various scale elements, which enclosure when folded up will present a very compact and conveniently transportable package, and which enclosure when so folded will also very effectively protect all of the scale elements and hold them in such relative positions that they will not be injured by shocks or jars which they may ordinarily receive, and so that when the structure is again opened up the operative parts will be caused to reassume their proper relative positions for correct operation.

More particularly one of the objects in this connection is to provide a box like casing and to so relate the two sections thereof that when said casing is folded up its top and bottom sections will be properly coordinated into a neat, attractive casing, and so that when the two sections thereof are opened out into the proper working positions and at right angles to each other the link connections between the platform and the scale beam will naturally assume their correct operative position.

Another feature of the invention relates to the manner in which the platform is mounted on the levers and is connected thereto. In this connection one of the objects is to so relate the parts that they may not become disconnected by inversion, and so that the parts will always retain their proper operative positions when the structure is folded up and carried about.

Another feature of the invention relates to the provision of a special form of hinge for joining together the two sections of the enclosure, so that these two sections will assume the correct relative positions when the structure is either opened out or closed up.

Another feature of the invention relates to the provision of an improved form of beam supporting and locking device for holding the balance beam away from the knife edges when out of service.

Still another feature of the invention relates to the provision of a measuring stand in conjunction with the enclosure for taking the height of the patient as measured above the position of the scale platform or the floor. This height measuring device is so related to the closure itself that when in operative position the height of the patient may be measured with the provision of a minimum length of height measuring attachment.

In this connection still another object is to provide a foldable or demountable height measuring device which may be readily folded up or dismounted from the scales themselves, and which is so related in size and form to the scales that it may be easily packed into or adjusted to the scale enclosure at which time it will not increase the bulk or unwieldiness of the entire package.

Other objects and uses of the invention will appear from a detailed description of the same, which consists in the features of construction and combinations of parts hereinafter described and claimed.

In the drawings:

Fig. 3 shows a horizontal section taken on the line 3—3 of Fig. 1 looking in the direction of the arrows;

Fig. 4 shows a detail face view of one of the beam supporting brackets in lowered position;

Fig. 5 shows a view corresponding to Fig. 4 with the exception that the device is shown in raised position;

Fig. 6 shows a side view corresponding to Fig. 4;

Fig. 7 shows an enlarged view of one of the hinges and the adjacent corners of the box sections, the latter being opened out into the working position;

Fig. 8 shows a view corresponding to Fig. 7 with the exception that the sections of the enclosure have been folded together into the closed position;

Fig. 9 shows an enlarged detail view of one of the knife edge mountings and the link which engages the same, showing the manner in which these parts are held together; and Fig. 10 shows a side view corresponding to Fig. 9.

Figure 1:
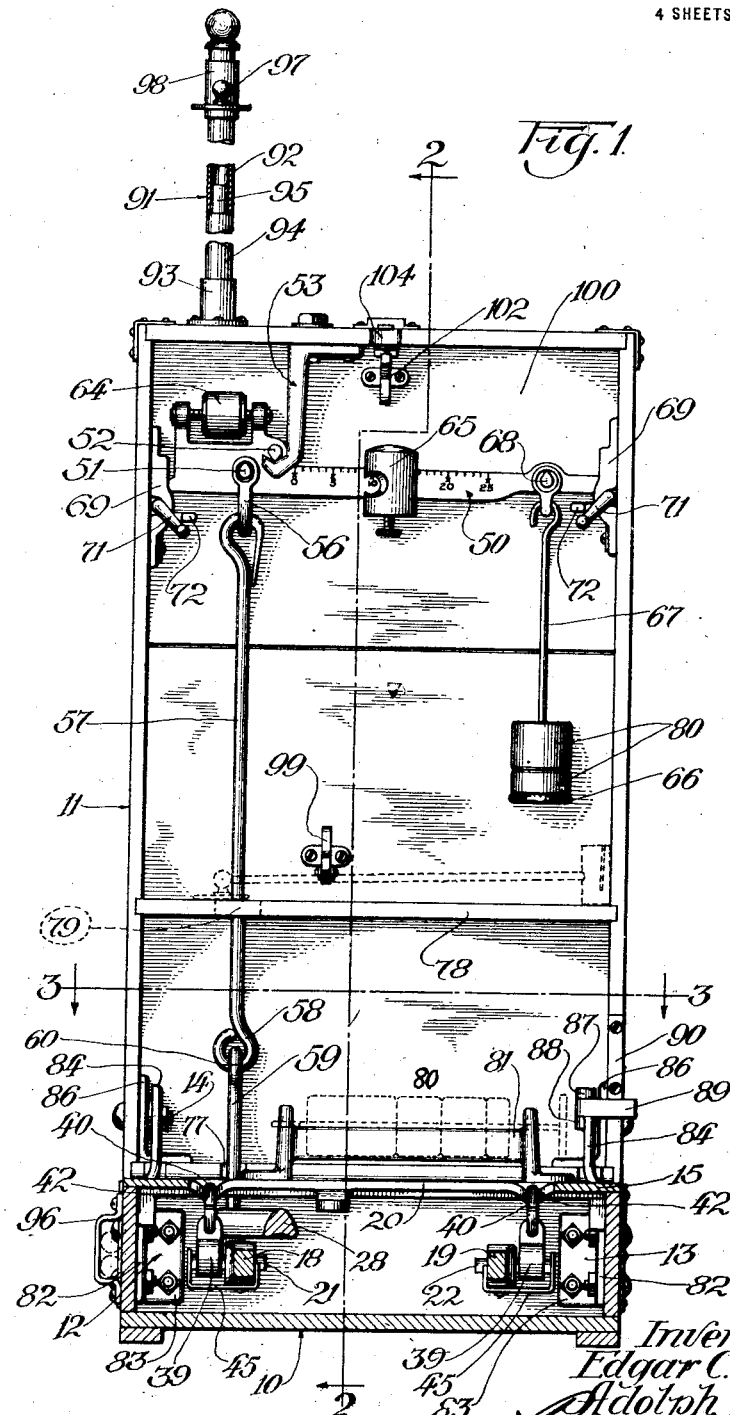
Figure 1 shows a vertical section through the platform taken on the line 1—1 of Fig. 2, looking in the direction of the arrows; a portion of the height measuring stand being shown in section.
Figure 2:
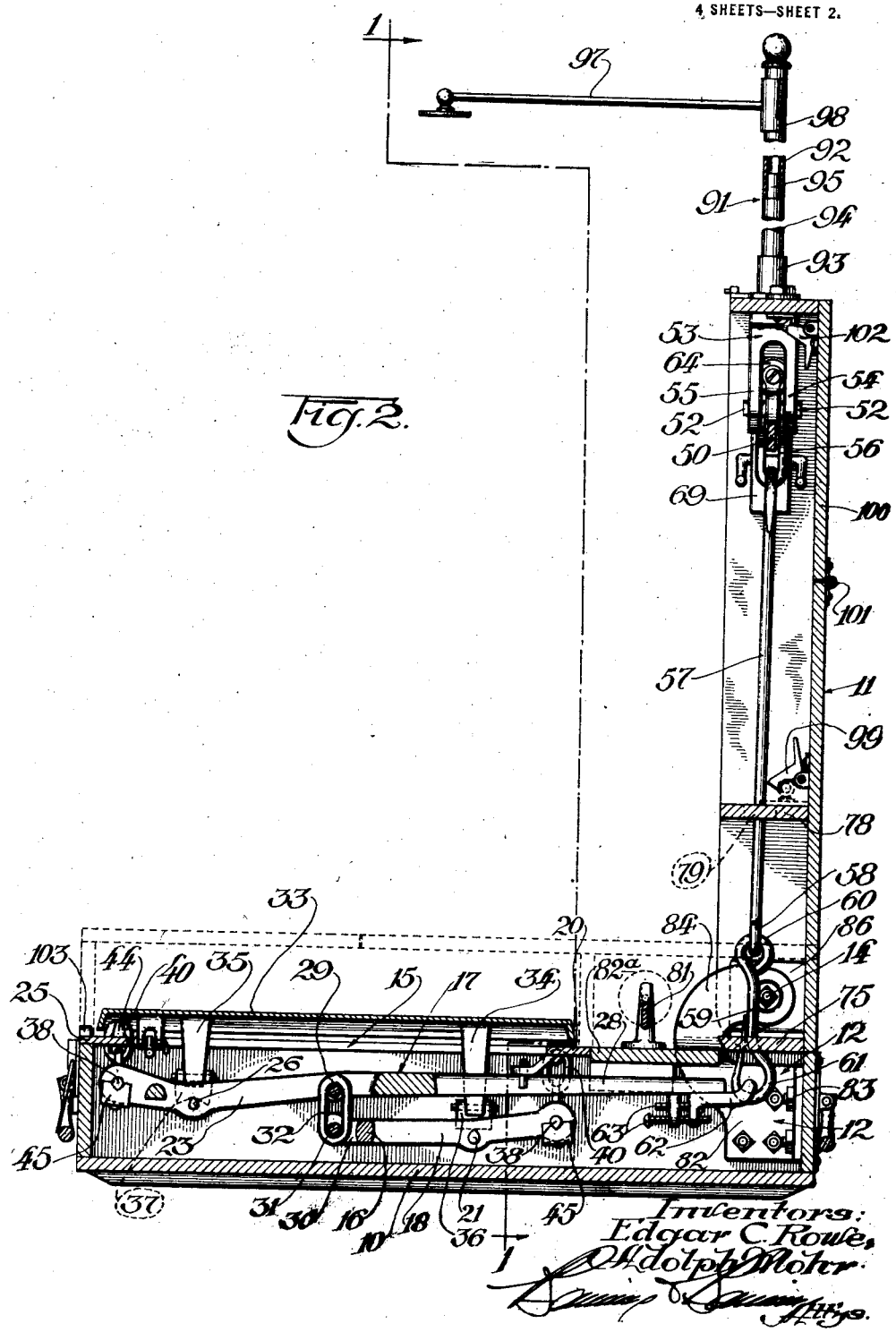
Fig. 2 shows a vertical section taken on the line 2—2 of Fig. 1, looking in the direction of the arrows, a portion of the height measuring stand being shown in section.

Referring first to Figs. 1, 2 and 3, the enclosure which serves also as the frame for the various operative parts comprises the two box members 10 and 11 respectively. The member 10 constitutes the base and the member 11 the stand of the frame.

The base member 10 is open on substantially all of its top surface, and the stand member 11 is open on substantially all of its front surface when in the working position. These two members are joined together by a pair of hinges designated in their entirety by the numerals 12 and 13 respectively, and the construction of which we will explain in detail presently. We will state at this point, however, that these hinge members are so formed and are so related to the base and stand members that when these members are folded together as shown by the dotted lines in Fig. 2, they will together provide a closed box within which will be contained all of the operative parts of the scales. For this purpose, the pivotal points 14 of the two hinges should be located a distance above the top surface of the base member 10 substantially equal to one-half the thickness of the stand member 11, and said pivotal points should also be located forward of the back edge of the base member a similar distance.

On the forward portion of the base member is located a rectangular plate 15 which is open in its central portion, and which rests around the front and side edges of the base member. This plate 15 serves as a convenient element to which may be connected certain of the links for the various levers.

There are provided two platform supporting levers designated by the numerals 16 and 17 respectively. The lever 16 is U-shaped, having its ends 18 and 19 swung from the rear cross piece 20 of the plate 15. This lever 16 has the sidewise projecting knife edges 21 and 22 for the rear corners of the platform.

The lever 17 is of generally Y-shape, and has the forwardly projecting arms 23 and 24 respectively, which are swung from the front cross piece 25 of the plate 15. This lever 23 is provided with the sidewise projecting knife edges 26 and 27 for the front corners of the platform. The stem 28 of the Y-shaped lever 17 projects rearwardly to a position close to the end of the base member 10.

Extending across the lever 17 at a point close to the junction of the arms 23 and 24 is a knife edge 29. Projecting forward from the central portion of the U-shaped lever 16 are the lugs 30 between which extends a knife edge 31. The knife edges 29 and 31 face respectively upwards and downwards, and a loop 32 surrounds both of them and joins them together. This loop 32 may be closed around the two knife edges after they have been set into position within their respective levers or the knife edges 29 and 31 themselves may be set into place by moving them through the loop. Ordinarily, however, the knife edges will be cast directly into the levers in which case the loop will be completely around the previously set knife edges.

The platform 33 is provided with two downwardly extending rear corner posts 34 and with two downwardly extending front corner posts 35. The posts 34 are provided on their lower ends with hardened blocks 36 which have flat bottom faces and rest directly upon the knife edges 21 and 22. The front corner posts 35 have on their lower ends the hardened blocks 37 which are provided with V-shaped or concave lower surfaces which rest upon the front knife edges 26 and 27. The front corner posts 35 thus serve to position the platform in the correct position forwards and backwards with respect to the levers 16 and 17 and with respect to the various knife edges, the rear corner posts 34 being able to adjust themselves into the same positions as dictated by the front corner posts.

The arms 18 and 19 of the lever 16 and the arms 23 and 24 of the lever 17 are suspended respectively from the rear and front cross pieces 20 and 25 of the plate 15. This is done in the following manner: Each of these arms is provided with a sidewise projecting downwardly facing knife edge 38. Each of these knife edges is surrounded by a hardened metal block 39 which in turn is suspended from a corresponding cross piece 20 or 25, as the case may be, by means of a link 40. The links 40 which depend from the rear cross piece 20 pass through perforations 41 in said cross piece and are suspended from the depressed portions 42 of said cross piece. The links 40 which carry the front ends of the lever arms 23 and 24 pass through perforations 43 in the cross piece 25 and are sustained by raised blocks 44 of said cross piece. It is to be observed that the U-shaped lever 16 lies beneath the Y-shaped lever 17 and therefore at a lower elevation. By depressing the portions of the cross piece 20 from which the arms of the lever 16 are suspended, and by raising the portions of the cross piece 25 from which the arms of the lever 17 are suspended we make it possible to use standard links and other standard parts for the suspension of both of the levers.

The form of each of the knife edge suspensions just described is shown in detail in Figs. 9 and 10. As shown therein a U-shaped sheet metal plate 45 is secured to the bottom portion of each of the lever arms, one end 46 of said plate overlying the outside end of the corresponding knife edge, and the other end 47 of said plate lying against the inside face of the lever arm. The part 47 is provided with a V-shaped groove 48 which co-operates with the knife edge itself, so as to prevent twisting of the plate 45 with respect to the lever arm. In this way the portion 46 of the plate 45 is retained in proper position against the end of the knife edge and said plate 45 is retained against rotation notwithstanding that it may be held in place by a single screw or rivet 49.

The balance beam 50 is located within and across the upper portion of the stand member 11. Said balance beam is provided with the upwardly facing knife edge member 51 and with the downwardly facing knife edge member 52. The latter engages the bracket member 53 which is suspended from the top end of the stand member. This bracket member 53 is bifurcated as shown in Fig. 2, so as to provide the downwardly depending fingers 54 and 55 which engage the two ends of the knife edge member 52.

A U-shaped link 56 is provided which engages the two ends of the knife edge member 51. A link 57 is suspended from the member 56 and its lower end 58 reaches to a point near the lower end of the stand member 11 where it terminates in a loop. A short link member 59 has its upper end 60 terminating in a loop which engages the loop 58, and the lower end of the link member 59 is provided with a loop 61 which engages the finger 62 which reaches out beyond the rear end of the lever arm 28 of the Y-shaped member 17. This finger member 62 may be set back and forth with respect to the lever arm 28 by proper adjustment of one or more screws 63, so that the effective length of the lever arm 28 may thus be adjusted in order to properly calibrate the scale.

The scale beam 50 is provided with the usual adjustment block 64, and with the usual slide weight 65 and pan 66. This pan is suspended from the free end of the scale beam by means of a hook 67 mounted on the knife edge member 68. The hook 67 may be readily disconnected from the scale beam when the scales are to be folded up into the inoperative position.

At each end of the scale beam there is provided a bracket member 69 which is shown in detail in Figs. 4, 5 and 6. Each of these bracket members carries a crosswise extending rock shaft 70 having the fingers 71 by means of which it may be rotated. Said rock shaft carries the lug member 72 having in its end the recess 73 for the accommodation of the end portion of the scale beam 50, so as to sustain the same in the position shown in Fig. 5 when the arms 71 are turned up as shown in said figure. A spring 74 has one end secured to the bracket, and its free end works against a depression of the rock shaft 70 in such a manner as to retain said rock shaft either in the one position or the other. Therefore, when the fingers 71 are turned upwards the scale beam will be sustained under spring pressure and away from the knife edge member 52.

The bottom end 75 of the stand member 11 is provided with a perforation 76 having at its inner end a slot 77. This perforation and slot are located in a line with the position of the lower link member 59 when the stand member 11 is in the raised position. Therefore, when the stand member is raised the link member 59 will pass into said slotted opening and assume the proper position for transmitting the load to the scale beam 50. In this connection, it is to be observed that this arrangement makes it possible to carry the rear end of the lever 28 backwards to a point directly beneath the position which the scale beam occupies in service. This result is made possible while at the same time placing the scale beam within the body of the stand member 11 all of which will be clearly understood from a comparison of Figs. 1, 2 and 3.

Ordinarily a partition member 78 will be placed across the central portion of the stand member. When this is done, said partition member should be provided with a perforation 79 through which the link member 57 passes.

Examination of Fig. 2 shows by dotted lines that when the stand member is folded down into contact with the base member, the partition member 78 comes into a position immediately above the cross bar 20 of the plate 15 and immediately behind the position of the platform 33. In this way said platform is held in proper position and is not allowed to shift a material amount in any lateral direction when the scales are folded up.

It will also be observed that when the scales are folded up into the dotted line position of Fig. 2, the lower link member 59 pivots on the lower end of the upper link member 57 and also pivots on the rear end of the lever arm 28, so that it is possible to fold up the scales without interference from said link members. This result is made possible by sectionalizing the link member and also by the use of a relatively short lower end section in said link member.

The pan 66 may carry the usual weight blocks 80 as shown in Fig. 1. Ordinarily these weight blocks will rest on a bracket 81 which is located on a cross piece 82 on the upper rear portion of the base member. Said bracket is so positioned and of such size that any weight blocks 80 resting upon it when the stand member is folded down into the dotted line position of Fig. 2 will be held in place, the amount of clearance being too small to permit the weight blocks to fall away from the bracket member 81 even in case the folded scales should be inverted. At such times also the pan hook 67 may be laid down onto the bracket 81 in the manner shown by the dotted lines of Fig. 1, the weight blocks being laid over the stem of the hook 67.

In Figs. 7 and 8, we have shown in detail the particular form of hinge which we have provided for joining the stand and base members together. Said hinge includes a bracket member 82 which has the L arm 83 and which bracket member is secured into the corner of the base member. Said bracket member is provided with the upwardly grooved arm 84 which is so shaped as to provide a U-shaped opening 85 behind it. Said U-shaped opening 85 reaches forward far enough to fully accommodate the rear end piece 75 of the stand member when the stand member is raised into the working position of Fig. 7. The bracket member 84 has its upper end carried rearwardly far enough to establish the pivotal points 14 in substantially the position previously mentioned herein.

Another hinge member 86 is secured within reach of the rear corners of the stand member and in position to cooperate with the bracket members 82. Both the bracket and hinge members are pinned together in any suitable manner, as by means of bolts as shown in the various figures.

It will be observed in connection with the foregoing construction of hinge that the bracket arms 84 are offset in their rising portions a distance substantially equal to the thickness of the hinge member 86, so as to reach against the inside faces of the hinge members to which they are pivotally connected. The particular bracket member 84 shown in detail in Figs. 7 and 8 is also provided with the forwardly projecting fingers 87 and 88 between which is pivoted a block 89. Said block may be turned out into the position shown in Figs. 1 and 7 at which time it will engage the lower edge of a plate 90 and thus sustain the stand member in the erect position.

The height measuring device is designated in its entirety by the numeral 91. It includes a tubular member 92 the lower end of which may be connected onto a stand member 93 in removable fashion. When so connected to the stand member 93 the tubular member 92 will reach up high enough above the stand member 11 to measure the height of the children for whom the instrument is normally intended to be used. In this connection we may state that experience shows that ordinarily the height of the stand member 11 when in raised position combined with the length of the base member 10 is sufficient to measure the height of practically all children of ordinary school age. In case this is not possible, it is almost invariably possible to do so by using a tubular member 92 of double the length of the base member 10 and sectionalized in its mid portion. We have shown such a sectionalized member which includes the lower section 94 joined to the section 92 by a tongue and groove connection 95. The two sections 92 and 94 may be conveniently carried when not in use on one side of the base member 10 by means of a pair of brackets 96 as shown in Figs. 1 and 3. The head piece 97 which slides up and down on the tubular portions is provided with a split sleeve 98 by means of which the tubular sections are engaged with a sufficient amount of friction to hold the head piece in the position into which it may be set. When the head piece 97 is removed it may be conveniently carried against the cross member 78 of the stand member 11 by means of a spring pressed hook 99 as clearly shown in dotted lines in Figs. 1 and 2.

Ordinarily the upper portion of the body of the stand member will be provided with a door 100 hinged at its lower edge 101, so that it can be turned down in order to open up the stand member and thus permit the balance beam 10 to be manipulated from both front and rear. A hook 102 serves to hold said door normally in the closed position of Figs. 1 and 2.

A lug 103 is conveniently formed on the plate 15 for engagement with a notch 104 on the edge of the stand member when the two members are folded together so as to prevent shifting at such times.

We claim:

1. A collapsible platform weighing scale including in combination two companion box members one of which constitutes a base member and the other of which constitutes a stand member, the base member being open on its top side and the stand member being open on its front side, hinge brackets on the rear portion of the base member having upstanding and rearwardly extending arms, the lower edges of said arms being at a greater elevation than the top edge of the base member, pivotal connections between said arms and the lower portion of the stand member, said pivotal connections being located in advance of the rear edge of the base member and above the top edge of the base member a distance equal to substantially one half the thickness of the stand member and being located in advance of the back of the stand member and above the bottom edge of the stand member a distance substantially equal to one-half the thickness of the stand member, the base and stand members having substantially the same length and breadth, whereby when the stand member is turned into the vertical position its back surface lies substantially flush with the rear edge of the base member and whereby when the stand member is turned down to bring its forward edge into contact with the top edge of the base member its top and bottom edges align respectively with the front and rear edges of the base member, a balance beam extending across the upper portion of the stand member, a pivotal support on the stand member for the balance beam, a platform beam extending rearwardly within the base member, a pivotal support for the front end of said beam on the base member, a platform whose weight is exerted on said platform beam, a sectionalized link extending between the rear end of the platform beam and the work end of the scale beam, and there being a slotted opening in the lower end of the stand member in position to accommodate said sectionalized link when the stand member is in working position and in position to pass the sectionalized link when the stand and base members are folded together, substantially as described.

2. A collapsible platform weighing scale including in combination two companion box members one of which constitutes a base member and the other of which constitutes a stand member, the base member being open on its top side and the stand member being open on its front side, hinge brackets on the rear portion of the base member having upstanding and rearwardly extending arms, the lower edges of said arms being at a greater elevation than the top edge of the base member, pivotal connections between said arms and the lower portion of the stand member, said pivotal connections being located in advance of the rear edge of the base member and above the top edge of the base member a distance equal to substantially one half the thickness of the stand member and being located in advance of the back of the stand member and above the bottom edge of the stand member a distance substantially equal to one half the thickness of the stand member, the base and stand members having substantially the same length and breadth, whereby when the stand member is turned into the vertical position its back surface lies substantially flush with the rear edge of the base member and whereby when the stand member is turned down to bring its forward edge into contact with the top edge of the base member its top and bottom edges align respectively with the front and rear edges of the base member, and a suitable balance beam within the stand member, a suitable weighing platform within the base member, and an operative connection between the weighing platform and the balance beam, substantially as described.

3. A collapsible platform weighing scale including in combination two companion box members one of which constitutes a base member and the other of which constitutes a stand member, the base member being open on its top side and the stand member being open on its front side, hinge connections between the rear portion of the base member and the lower portion of the stand member so positioned that when the stand and base members are at right angle to each other the back surface of the stand member lies substantially flush with the rear edge of the base member and such that when the stand member is turned down to bring its forward edge into contact with the top edge of the base member, its top and bottom edges align respectively with the front and rear edges of the base member, a balance beam extending across the upper portion of the stand member, a pivotal support on the stand member for the balance beam, a platform beam extending rearwardly within the base member, a pivotal support for the front end of said beam on the base member, a platform whose weight is exerted on the platform beam, a sectionalized link extending between the rear end of the platform beam and the work end of the scale beam, and there being a slotted opening in the lower end of the stand member in position to accommodate the stand member in its working position and in position to pass the sectionalized link when the stand and base members are folded together, substantially as described.

4. A collapsible platform weighing scale including in combination two companion box members one of which constitutes a base member and the other of which constitutes a stand member, the base member being open on its top side and the stand member being open on its front side, hinge connections between the rear portion of the base member and the lower portion of the stand member such when the base and stand members lie at right angles to each other, the rear surface of the stand member aligns with the rear edge of the base member, such that when the stand and base members are folded together the top and bottom edges of the stand member align respectively with the front and rear edges of the base member, a platform beam extending lengthwise of the base member and having its rear end beneath the position occupied by the stand member when the stand and base members are at right angles to each other, a scale beam pivotally mounted within the stand member, an operative connection between the platform beam and the scale beam, a platform on the platform beam projecting above the upper surface of the base member, and a partition extending across the stand member in position to lie immediately behind the platform when the base and stand members are folded together, substantially as described.

5. A collapsible platform weighing scale comprising in combination two companion box members one of which constitutes a base member and the other of which constitutes a stand member, the base member being open on its top side and the stand member being open on its front side, hinge connections between the stand and base members such that when said members are at right angles to each other the stand member overlies the rear portion of the base member, a platform beam extending longitudinally of the base member, a scale beam within the stand member, an operative connection between the rear end of the platform beam and the scale beam when the stand and base members lie at right angles to each other, a weight pan removably connected to the scale beam, slotted weights for the same, and a bracket member for said weights extending across the upper portion of the base member in position to receive said weights with their slots facing downwardly, said bracket and weights being relatively so positioned and of such size that when the weights are on the bracket and the stand and base members are folded together the weights are retained on the bracket by engagement with the stand member, substantially as described.

EDGAR C. ROWE.
ADOLPH MOHR.